United States Patent [19]
Catherwood

[11] 3,835,818
[45] Sept. 17, 1974

[54] METHOD OF OPERATING A ROTARY PISTON INTERNAL COMBUSTION ENGINE

[76] Inventor: Herbert C. Catherwood, 329 Upper Sherman Ave., No. 2, Hamilton 53, Ontario, Canada

[22] Filed: Sept. 10, 1973

[21] Appl. No.: 396,075

Related U.S. Application Data

[62] Division of Ser. No. 263,463, June 16, 1972, Pat. No. 3,791,353.

[52] U.S. Cl. ............................................. 123/8.33
[51] Int. Cl. ............................................. F02b 53/02
[58] Field of Search ....... 123/8.05, 8.27, 8.31, 8.33, 123/8.35

[56] References Cited
UNITED STATES PATENTS
3,228,183   1/1966   Feller.............................. 123/8.05 X Primary Examiner—Carlton R. Croyle
Assistant Examiner—Michael Koczo, Jr.
Attorney, Agent, or Firm—Sim & McBurney

[57] ABSTRACT

A rotary internal combustion engine is operated to achieve smooth and efficient power output. A compressed air-fuel mixture which has been subjected to turbulence is transferred from one zone to an ignition zone wherein it is ignited. The ignited mixture increases in volume in regular manner to impart rotation of the rotor after the ignition. The expansion of the ignited mixture causes exhaustion of the mixture ignited on the previous cycle.

2 Claims, 3 Drawing Figures

PATENTED SEP 17 1974 3,835,818

3,835,818

METHOD OF OPERATING A ROTARY PISTON INTERNAL COMBUSTION ENGINE

REFERENCE TO RELATED APPLICATION

This application is a division of Ser. No. 263,463 filed June 16, 1972 (now U.S. Pat. No. 3,791,353).

FIELD OF INVENTION

This invention relates to the operation of a rotary internal combustion engine, more particularly to the operation of a rotary automobile engine.

BACKGROUND TO THE INVENTION

Rotary automobile engines have advantages over piston engines in that by the provision of a rotor which rotates within a stationary enclosure, the piston of the conventional internal combustion engine is eliminated. In the conventional piston engine, the piston must come to a complete halt every time it reverses direction and requires a connecting rod and crankshaft to convert its up and down motion into torque, whereas the rotary engine directly generates torque although in some designs of rotary engine a "top dead center" type problem still exists. In this way an engine is provided which has fewer moving parts, has less weight and occupies less space, for a comparable horsepower.

Further, the piston internal combustion engine is inefficient in its use of the power available in the exploded air-fuel mixture. If a piston engine has a 3-inch stroke, then the crank distance, i.e., the distance from the centre of the driveshaft to the centre of the crank bearing where the driving pressure is applied, is 1½ inches. In the piston engine, the pressure from the explosion is applied with full efficiency only while the connecting rod is at right angles to the crank and thus there is maximum leverage on the crank. Thus, as the crank turns from the top-dead-centre position of the piston where the pressure from the explosion in relation to torque is zero, the leverage efficiency increases progressively until the right-angle position is achieved and then drops off until the crankshaft reaches the bottom-dead-centre position of the piston, where the leverage efficiency again is zero. Hence, the only significant productive leverage on the crank from the pressure applied is derived between the 2 and 4 o'clock positions of the revolution of the crankshaft. Thus, there is inefficient conversion into power output of the pressure of the explosion of the air-fuel mixture in the piston engine. As will become apparent below, the rotary engine of the present invention does not suffer from this defect.

A number of suggestions have been made to employ a rotor mounted for rotation within a stationary casing and including a plurality of retractable vanes mounted substantially radially in the rotor.

A typical example of such a rotary engine is disclosed in U.S. Pat. No. 1,279,195, in which a substantially circular rotor is mounted in an elliptical chamber. During the explosion, a compressed air-fuel mixture is positioned between a pair of vanes. The pressure generated by the explosion is generally between about 100 and 300 psi depending on the degree of compression of the air-fuel mixture and hence if the vanes are to move outwardly to follow the divergent surface of the inner wall of the chamber, then a considerable spring force would be required. This heavy spring force would lead to rapid wear of the vanes and the internal wall of the chamber. It would appear that if a lesser spring force were employed to overcome this wear problem, then upon explosion the vanes would be locked in their position relative to the rotor and hence the expanding gases would pass over the top of the vane to the exhaust and hence a very inefficient engine is provided. Further, in this prior art engine, the only power gain is from the difference in the distance the leading and trailing vanes are displaced from the rotor, which is determined by the arc of the casing. When the midway position between the two vanes is 90° removed from the firing position, then they balance each other out and no power would be delivered.

Similar problems are encountered with the engine disclosed in U.S. Pat. No. 917,165 where again a circular rotor is mounted in an elliptical casing and the vanes engage the inner walls of the casing. In this prior art engine the problems are compounded since in this instance, the pressure of the compressed gases before ignition tends to prevent the vanes from extending to engage the wall. The patent specifies a fixed compression and this is necessary since if the compression were increased over this amount, it would prevent the vane from radially outward movement and the mixture would be lost over the top of the vane. For an engine to be practical, it must be capable of handling a wide range of compression pressures to achieve variations in speed.

SUMMARY OF INVENTION

The present invention is concerned with the operation of a rotary engine of the vane type which does not suffer from the drawbacks of prior art vane-type rotary engines, and at the same time provides the advantages that rotary engines in general have as compared to conventional piston engines. The method of operation of a rotary engine preferaby is carried out on the rotary engine which forms the subject of parent application Ser. No. 263,463 out of which the present application is divided. The latter rotary engine does not suffer from the "top dead center" and leverage problems which are suffered by other types of rotary engines, such as the Wankel engine.

The Wankel engine includes a three-cornered rotor which revolves on a round cam that is solid on the take-off shaft. The chamber is of generally oval cross-sectional shape and each of the three corners of the rotor engage the inner wall of the chamber during rotation. In order to achieve this, the rotor has a central circular opening having gear teeth on the inner face and these teeth mesh with a small pinion gear mounted solidly on the end plate. The rotor, therefore, rotates eccentrically about the power take-off shaft.

DESCRIPTION OF PREFERRED EMBODIMENTS

Figure 1:
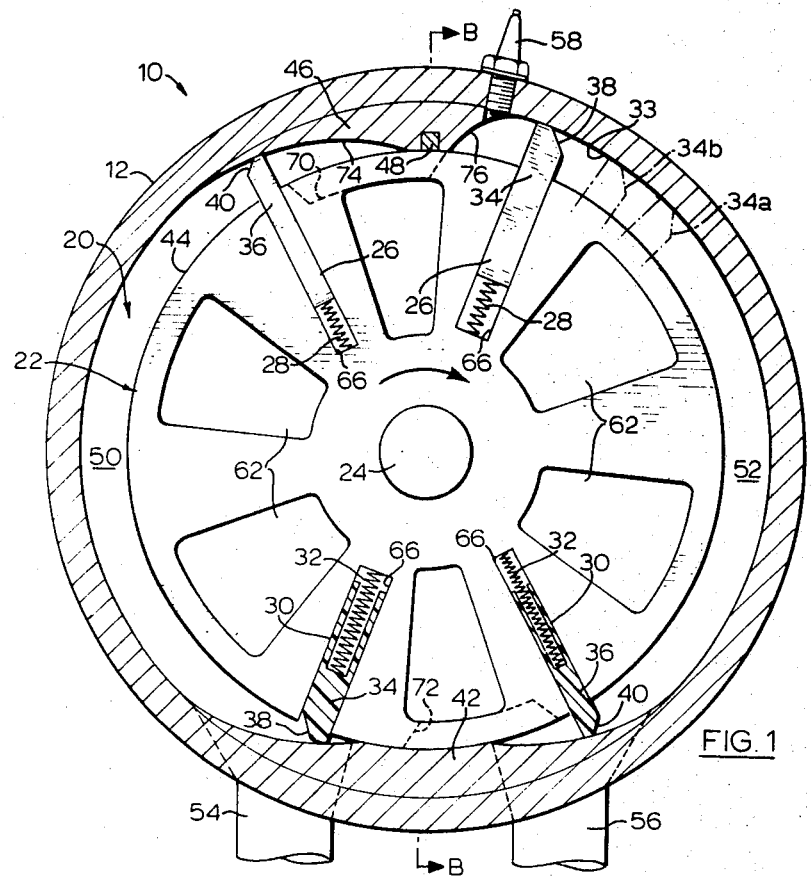
FIG. 1 is a cross-sectional view of a rotary engine in accordance with one embodiment of this invention and taken along line A—A of FIG. 2.

With reference to the drawings, a rotary engine 10 includes a stationary body 12 in the form of cylinder 14 having end closures 16 and 18. The body 12 defines an enclosure 20 within which is rotatably mounted a rotor 22. The rotor 22 is fixedly mounted on a shaft 24 journalled for rotation on the axis of the cylinder 14 generally in a clockwise direction as viewed in FIG. 1 and projecting through the end closures 16 and 18. Rotor 22 as seen in FIG. 1 has a substantially circular cross-section.

A first pair of vanes 26 is slidably mounted in the body of the rotor 22 and each of the vanes is biased, such as by springs 28 outwardly of the rotor 22 to engage in touching relationship the inner wall 33 of the cylinder 14. A second pair of vanes 30 is slidably mounted in the body of the rotor 22 and each of the vanes is biased, such as by springs 32 outwardly of the rotor 22 to engage in touching relationship the inner wall 33 of the cylinder 14. Usually, a pair of springs in spaced apart side-by-side relation are used with each vane, although only a single spring is illustrated.

Each pair of vanes 26 and 30 includes a forward member 34 in the direction of intended rotation of the rotor 22, herein referred to as a "power" vane, and a trailing member 36, herein referred to as a "pressure" vane. The reason for this terminology will become apparent hereinafter when the manner of operation of the engine is described.

Each of the vanes 34 and 36 extends substantially the depth of the cylinder 14 between the end closures 16 and 18, and generally the power vanes 34 are thicker than the pressure vanes 36, although any desired relative size may be employed.

Each of the power vanes 34 has a chamfered leading edge 38 and each of the pressure vanes 36 has a chamfered trailing edge 40. The reason for the presence of these chamfered edges will become apparent hereinafter.

The vanes in each of the pairs 26 and 30 may be constructed of any convenient material, preferably "TEFLON" (Trademark). This material is preferred since it is light in weight and self-lubricating and has high wear and heat resistance.

A first abutment or baffle 42 is provided which is secured in any convenient manner to the inner wall 33 of the cylinder 14 and engages in touching relation the peripheral surface 44 of the rotor 22.

A second abutment or baffle 46 is provided in diametrically opposed relation to the first abutment 42. The second abutment 46 is secured in any convenient manner to the inner wall 33 of the cylinder 14 and engages the peripheral surface 44 of the rotor 22. A seal 48 of any convenient form and material of construction is provided in the abutment 46 so that sealing engagement between the peripheral surface 44 of the rotor 22 and the second abutment 46 normally is achieved. Preferably, the seal is constructed of graphite.

Between the peripheral surface 44 of the rotor 22 and the inner wall 33 of the cylinder 14 and extending between the first and second abutments 42 and 46 in the direction of intended rotation of the rotor 22 is provided a first chamber 50. The second chamber 52 is provided between the peripheral surface 44 of the rotor 22 and the inner wall 33 of the cylinder 14 and extending between the second and first abutments 46 and 42 in the direction of intended motion of the rotor 22. Since the rotor 22 and the cylinder 14 are substantially concentric, in the chambers 50 and 52, with the exception of the areas adjacent the abutments 42 and 46, the defining inner and outer surfaces are spaced apart the same distance throughout a substantial portion of their arcuate length.

An inlet pipe 54 is provided through the cylinder 14 in fluid flow relationship with the first chamber 50 and an outlet pipe 56 similarly is provided through the cylinder 14 is fluid flow relationship with the second chamber 52, the pipes 54 and 56 being positioned one each arcuate side of the first abutment 42.

A spark plug 58 or other spark forming means passes radially through the cylinder 14 and terminates in the second chamber 52 adjacent the second abutment 46.

Figure 3:
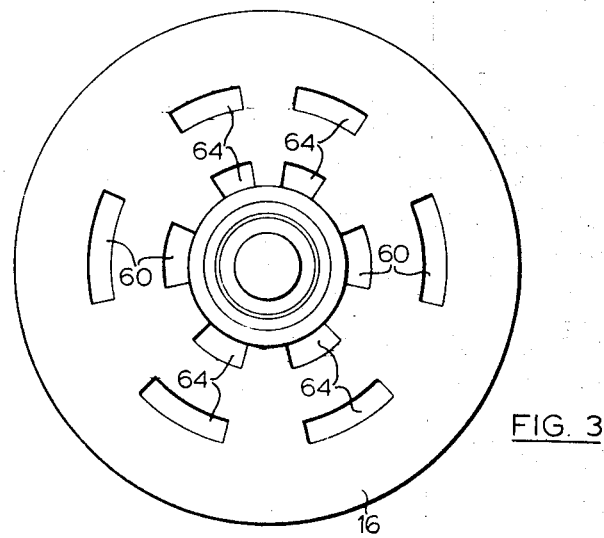
FIG. 3 is an elevational view of an end plate.
Figure 2:
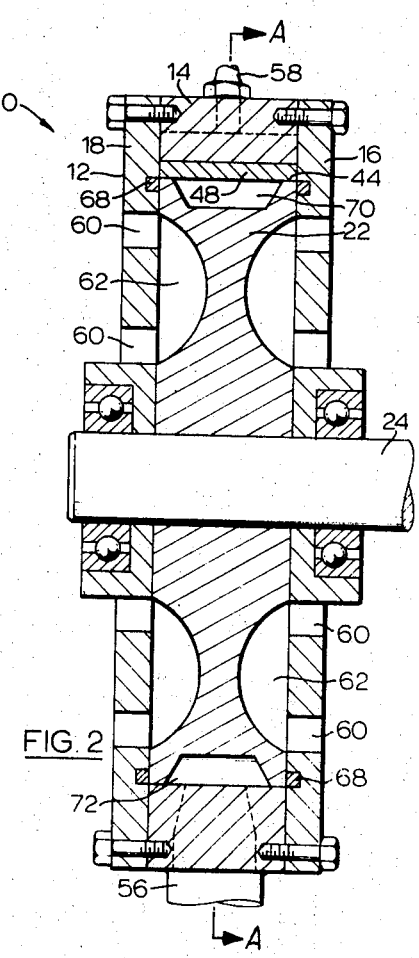
FIG. 2 is a cross-sectional view of the rotary engine of FIG. 1, taken along line B—B of FIG. 1.

The end closures 16 and 18, as may be seen more clearly in FIGS. 2 and 3 include a plurality of pairs of openings 60 in diametrically opposed relation. The openings 60 may communicate with a source of cooling air which passes through one of the openings 60 into recesses 62 formed in the rotor 22 to cool the rotor and passes out of the recesses 62 through the other of the openings 60. Other pairs of openings 64 are provided which communicate with the channels 66 in the rotor 22 receiving the vanes 26 and 30 when the channels 66 are aligned with the openings 64. The purpose of this communication will become apparent hereinafter.

A sealing ring 68, typically constructed of graphite, positioned in a recess in each of the end closures 16 and 18, engages the outer faces of the rotor 22 adjacent the periphery thereof to seal the chambers 50 and 52 from the openings 60 and 64.

Formed in the periphery of the rotor 22 between each of the pairs of vanes 26 and 30 is an arcuately extending recess or channel 70 and 72 respectively. The recesses 70 and 72 have substantially the same dimensions and each extend from substantially the location of the pressure vane in the direction of intended rotation of the rotor 22 to a position spaced from the power vane. The first abutment 42 and the recess 72 are of a size that fluid flow communication between the first chamber 50 and the second chamber 52 is impossible through the recess 72 at any time.

The second abutment 46 cooperates with the recess 70 to allow fluid flow communication between the first chamber 50 and the second chamber 52 through the recess 70 when the pair of vanes 26 straddles the second abutment 46 and the power vane 34 has moved to a position within the second chamber 52 wherein the seal 48 is positioned between the arcuate extremities of the recess 70.

When the rotor 22 has rotated through substantially 180°, the recess 72 assumes the position of the recess 70 and the recess 70 assumes the position of the recess 72. Since the recesses 70 and 72 are of substantially the same dimension, the dimensional observations made above with reference to the abutments 42 and 46 apply equally in this orientation.

The provision of recesses 70 and 72 represents only one manner in which fluid transfer between the first chamber 50 and the second chamber 52 may be achieved. Other means may be employed, for example, a pressure sensitive one-way valve or a mechanically operated one-way valve. However, the recesses 70 and 72 utilized in the illustrated embodiment of the invention represent the preferred mode of achieving this fluid transfer since no additional moving parts are required.

OPERATION

In accordance with the method of operation of the present invention, assuming that the pressure vane 36 of the pair 30 is in the position of the power vane 34 of the pair 30, upon rotation of the rotor 22, an air-fuel mixture is drawn into the first chamber 50 through the inlet pipe 54 behind the pressure vane 36 of the pair 30 and this process continues until the pressure vane 36 of the pair 30 reaches the end of the first chamber 50 and the power vane 34 of the pair 26 passes the inlet pipe 54, i.e., approximately the position illustrated in FIG. 1, with the exception that the pairs of vanes 26 and 30 are interchanged.

Upon further rotation of the rotor 22, the air-fuel mixture in the first chamber 50 is compressed in front of the power vane. Meanwhile, further gas-fuel mixture is drawn into the first chamber behind the pressure vane 36 of the pair 26. When the pressure in front of the power vane 34 of the pair 26 acting on the chamfer 38 is large enough to over-come the bias of the spring 28 associated therewith, the compressed mixture forces the vane 34 inwardly of the inner wall 33 allowing the compressed mixture to pass rearwardly of the power vane 34 into the space between the pair of vanes 30, to join with the gas-fuel mixture therein to form a compressed gas mixture. The vane 34 then reassumes its position in touching engagement with the inner wall 33 under the influence of the spring 28 and centrifugal forces.

As is well known, the more turbulence to which an air-fuel mixture is subjected prior to ignition the more energy is derived from the ignition, and lack of turbulence in piston engines contributes greatly to its inefficiency. However, in the rotary engine of this embodiment by causing the compressed air-fuel mixture to pass rearwardly of the rotating power vane, turbulence is set-up in the air-fuel mixture and hence in the later explosion provides an increased power output for less fuel, as compared to a comparable piston engine.

During continued rotation of the rotor 22, the power vane 34 of the pair 26 reaches the end of the first chamber 50 and rides up the sloping surface 74 of the second abutment 46 until it passes the seal 48. The power vane 34 then rides down the relatively steep sloping surface 76 of the other side of the second abutment 46 under the influence of the spring 24 and centrifugal forces on the vane 34 and due to the steepness of the surface 76 rapidly is repositioned in touching engagement with the inner wall 33 of the cylinder 14. As may be seen in FIG. 1, at this position the air-fuel mixture is still compressed behind the second abutment 46 in the first chamber 50 since the leading portion of the recess 70 has not yet cleared the seal 48. In this way it is possible for the power vane 34 of the pair 26 to be returned to its position against the inner wall 33 of the cylinder 14 in the second chamber 52 before any fuel-air mixture is present in the second chamber 52. This has considerable advantages over the prior art rotary engines utilizing vanes, as discussed above.

When the rotor 22 rotates further, the leading portion of the recess 70 clears the seal 48, the compressed air-fuel mixture in the first chamber 50 passes through the recess 70 into the second chamber 52 behind the power vane 34 of the pair 26 and the pressure vane 36 of the pair 26 rides up the surface 74 of the second abutment 46 until the substantial proportion or all of the fuel-air mixture is provided in the second chamber 52 between the power vane 34 and the surface 76.

The fuel-air mixture then is exploded by use of the spark plug 58. The position of ignition may be varied as desired and the ignition position may be considered "advanced" or "retarded" in the sense of a conventional piston engine according to the position of the power vane 34 relative to the second abutment 46 upon ignition. The dotted outlines 34a and 34b represent ignition "retarded" and ignition "advanced" positions respectively. At the point of ignition the portion of the second chamber 52 between the power vane 34 and the second abutment 46 may be considered to be an ignition zone.

Upon explosion of the fuel-air mixture, the pressure so generated forces the power vane 34 of the pair 26 forward, thereby causing rotation of the rotor 22. As the rotor 22 rotates under the influence of the explosion, the pressure vane 36 of the pair 26 enters the second chamber 52. The bias of the spring 28 associated therewith and the centrifugal force to which the vane 36 is subjected is insufficient to overcome the pressure thereon resulting from the expansion of the gases in the second chamber 52 following the explosion and hence the pressure vane 36 of the pair 26 is prevented from returning to engagement with the inner wall 33 of the cylinder 14. The expansion of the gases continues forcing the power vane through the second chamber 52 until the pressure of the gases in the second chamber 52 is insufficient to prevent the pressure vane 36 from returning to touching engagement with the inner wall 33. Thus, the second chamber 52 acts as an expansion zone between the abutment 46 and the power vane 34 for the exploded gases as the power vane 34 moves therethrough. As indicated above the cylinder 14 and the rotor 22 are concentric, and hence the expansion zone increases in dimension regularly during expansion of the exploded gases. The pressure generated by the explosion is always applied against the power vane and, in the sense of the rotary engine, the pressure is always applied at right-angles to the driveshaft. Therefore, maximum leverage efficiency is achieved by the rotary engine of the invention, from the explosion to the end of the power stroke, and therefore the present invention achieves a considerable improvement in efficiency over piston engines and rotary engines of the Wankel type.

Additionally, during the power stroke, the power vane remains in a dead position relative to the rotor 22 due to this concentricity and, hence, the problems of the prior art vane-type rotary engines relating to the pressure of the gases do not arise.

Further, since substantially the whole of the power of the explosion and the consequent expansion of the gases is brought to bear on the power vane before the waste gases are exhausted, and before the pressure becomes so weak that the pressure vane resumes its position in touching engagement with the inner wall 33, the noise output of the engine in the exhaust gas line is considerably reduced with respect to a conventional piston engine, and hence it may be possible to eliminate the necessity for a muffler system with the rotary engine of the invention. Further, the full force of the explosion is utilized against the power vanes during the full length of the power stroke without any back pressure interference from the pressure vane.

During continued rotation of the rotor 22, the burnt gases positioned between the vanes 26 upon resumption of the positioning of the pressure vane 36 against the inner wall 33 are exhausted through the outlet pipe 56.

Simultaneously with the expansion of the gases in the second chamber 52, the pair of vanes 30 pass through the first chamber 50 in analogous manner to that described above with reference to the pair of vanes 26, with the provision of a compressed air-fuel mixture therebetween and the power vane 34 of the pair 30 reaching the end of the first chamber 50 while the power vane 34 of the pair 26 reaches the end of the second chamber 52.

When the pair of vanes 26 have exhausted the waste gases from therebetween through the outlet pipe then the vanes assume approximately the position shown in FIG. 1, for the pair 30 while at the same time, the pair 30 assume approximately the position shown in FIG. 1 for the pair 26.

The remainder of the waste gases from the above-described explosion are positioned in the second chamber 52 between the pressure vane 36 of the pair 26 and the power vane 34 of the pair 30. These gases are exhausted from the second chamber 52 through outlet pipe 56 by the power vane 34 of the pair of vanes 30 following explosion of the air-fuel mixture in the ignition zone defined by the power vane 34 of the pair 30 and the abutment 46.

The first abutment 42 extends arcuately in engagement with the rotor 22 a distance at least equal to the arcuate extension of the recesses 70 and 72 so that waste gases from the second chamber 52 cannot enter the first chamber 50 therethrough.

The cycle of operation described above is repeated with two power strokes occurring for each revolution of the rotor 22. It will be seen that a number of operations occur simultaneously, so that during the power stroke of one pair of vanes, waste gases from the previous explosion are vented, compression of air-fuel mixture by the power vane of the other pair of vanes occurs, and the pressure vane of the other pair draws further air-fuel mixture into the engine for compression by the first pair.

During compression and release of the springs 28 and 32 during the above operations, air respectively is expelled and drawn into the gap in the channels 66 beneath the vanes through the parts 64.

Since the springs 28 and 32, or other biasing means need not be powerful as is apparent from the above discussion of the manner of operation of the rotary engine of FIGS. 1 to 3, in contrast to the above-described prior art vane-type rotary engines, the rate of wear of the vanes and also of the internal surface 33 of the cylinder 14 is low and friction losses similarly are low. In this way, a considerable operational life may be realized before replacement of worn vanes is necessary. This life is increased further by using Teflon vanes and a chromised internal surface 33.

As indicated above, the rotor 22 is air-cooled through the parts 60, although a water cooling system may be employed, if desired. Similarly, water cooling of the outer cylinder 14 and end closures 16 and 18 may be carried out, if desired.

In the embodiment discussed above with reference to FIGS. 1 to 3, in each of pairs of the vanes 26 and 30, the pressure vanes 36 are offset slightly from each other and do not extend precisely radially of the rotor 22. If desired, the vanes may be positioned radially of the rotor 22, but the construction illustrated is preferred, since this aids in retraction of the pressure vanes into the channels as they engage the surfaces of the abutments.

The air-fuel mixture entering the first chamber 50 through inlet pipe 54 may be provided in any convenient manner, such as, carburation. The speed of rotation of the rotor 22 depends on the quantity and relative concentrations of the air-fuel mixture provided to the inlet pipe 54, as in the conventional piston engine and the mixture may be controlled by conventional throttle means.

It is apparent from the above discussion of the operation of the rotary engine of FIGS. 1 to 3 that the degree of compression of the air-fuel mixture in the ignition zone, and hence the compression ratio of the engine, is dictated by the arcuate distance between the members of the pairs of vanes, and this distance may be varied as desired to achieve the desired compression ratio.

The rotor 22 may act as its own fly-wheel or a separate fly-wheel exterior of the engine 10 may be provided, if desired. Conventional engine starting means may be associated with the engine 10.

The engine 10 may operate in any desired attitude. Preferably the engine 10 is positioned vertically, so that the power take-off shaft 24 may lead directly to a gear box of any convenient design. Alternatively, the engine 10 may be positioned horizontally or at any desired angle, and the power take-off from the shaft 24 to the gear box may be achieved with suitable gearing.

In the embodiment of the invention illustrated in FIGS. 1 to 3, there are provided two pairs of vanes 26 and 30. It is apparent from the manner of operation of the engine 10 as described above that more than two pairs of vanes may be provided, for example four pairs of vanes, with the other two pairs positioned in diametrically opposed parts of the rotor and approximately 90° to the existing pairs. In this way, the number of ignitions and hence power strokes for each revolution of the rotor 22 may be increased corresponding to the number of pairs of vanes utilized. In order to accommodate further pairs of vanes while ensuring adequate compression of the air-fuel mixture, it may be necessary to increase the dimensions of the cylinder 14 and of the rotor 22. Hence, while it is possible to increase the number of power strokes per revolution of the rotor 22, this increase may be at the expense of an increased bulk of engine.

The position of the spark plug 58 may be varied as as desired. In the embodiment illustrated, the plug 58 projects radially of the cylinder 14 into the ignition zone immediately adjacent the abutment 46. The spark plug 58 may be positioned arcuately removed from such location while still with the ultimate ignition zone or may be located in either of the end closures 16 and 18 projecting into the ignition zone, either adjacent the abutment 46 or arcuately removed therefrom. However, these latter constructions may lead to leaking of air-fuel mixture and the construction illustrated is preferred.

It will be apparent from the above that the rotary engine which is the subject of the present application has considerable advantages over the conventional piston engine. For example, the engine of the invention has considerably less weight and bulk (approximately 1/6 for comparable horse-power) than the piston engine. A very high torque may be provided at low RPM with improved gas mileage. Additionally, since no pre-ignition or knocking is possible, and low compression ratios may be utilized low octane fuels may be employed, realizing further operation cost economy, as compared to the piston engine. Additionally, backfiring is impossible.

Additionally, in view of the small number of parts involved, the cost of manufacture of the rotary engine of the invention is considerably less than that of the conventional piston engine for the same horsepower, in view of the absence of valves, connecting rods, cams, tappets, etc., in the engine of the present invention.

The rotary engine has other advantages as compared to the piston engine and other rotary engines such as the Wankel engine. Thus, four power strokes are achieved for each two revolutions of the rotor in the engine of the invention, as compared to one power stroke for each two revolutions of the crankshaft in the piston engine and one power stroke for each revolution of the drive shaft in the Wankel engine. This situation obtains when two pairs of vanes are employed and if more than two pairs are employed, with suitable adjustment of the dimension of the engine, more power strokes for each revolution of the rotor may be provided, and any desired horsepower may be achieved.

Additionally, the rotary engine of the invention does not encounter the "top dead center" and leverage problems of the piston and Wankel engine, and hence substantially all of the power of the exploding gas mixture is utilized to provide power output from the engine in the present invention. Thus, the rotary engine of the present invention provides an increased efficiency of the conversion of the explosion to vehicle driving power while at the same time experiencing fuel economy.

The full expansion of the ignited air-fuel mixture is utilized in the operation of the engine prior to exhaust of the waste gases and hence the engine is substantially noiseless and a muffler system may not be required, representing a considerable cost economy in the manufacture of automobiles while at the same time reducing noise pollution. Hence, another considerable advantage over the piston and Wankel engines is provided.

Further, the Wankel engine utilizes a heavy counterweight to control the vibration caused by the cam and rotor being offset from the centre of the driveshaft. The presence of this counterweight adds to the cost and weight of the engine. In the engine of the present invention, the driveshaft is mounted in the centre of the rotor and hence counterweights are unnecessary.

Also, the Wankel engine uses a large cam which has a large friction area between it and the rotor. There is a set of gears on which the rotor revolves and along with the cam, this set of gears creates a heavy friction load on the engine. In contrast, the engine of the present invention employs a rotor which requires no cams or gears to cause friction, and hence the overall efficiency is improved.

In addition, the Wankel engine requires the use of an oil reservoir and an oil pressure pump to pump oil to the friction areas of the cam and gears mentioned above and also to the driveshaft bearings. By contrast, there are no equivalent friction areas in the engine of the present invention and hence the need for an oil reservoir and an oil pressure pump is eliminated. The driveshaft of the present engine rides on ball bearings which may be grease sealed for the life of the bearing.

As already noted, the vane-type rotary engine of the parent application represents a considerable advance in the art of this type of rotary engine. The novel manner of operation of a rotary engine in accordance with the present invention makes it possible for the first time to achieve efficient use of power in a vane-type rotary engine without experiencing excessive wear of the vanes and the stationary body.

Modifications are possible within the scope of the invention.

What is claim is:

1. A method of operating a rotary internal combustion engine which comprises drawing an air-fuel mixture from a source of air-fuel mixture into a first zone, compressing said drawn air-fuel mixture in said first zone by reducing the volume of said first zone while simultaneously drawing further air-fuel mixture from said source into a second zone, transferring said compressed air-fuel mixture from said first zone to said second zone while subjecting said transferred mixture and said mixture already present in said second zone to turbulence, and drawing yet further air-fuel mixture from said source into a third zone, providing said turbulent mixture to an ignition zone while said third zone becomes said first zone, igniting said turbulent mixture in said ignition zone and allowing said ignited mixture to expand in an expansion zone of linearly increasing volume while simultaneously repeating said operations of compressing, transfer and rendering turbulent in said first and second zones, the expansion of said ignited mixture in said expansion zone imparting rotative motion to the rotor of said engine, and subsequently exhausting spent gases from said expansion zone by utilizing expansion of ignited gas mixture present in said ignition zone.

2. The method of claim 1 including incorporating said expansion zone with said ignition zone during said expansion and physically separating said ignition zone and said expansion zone when said expansion terminates.

* * * * *